July 17, 1923.

D. M. WEIGEL

INTERNAL COMBUSTION ENGINE

Filed June 23, 1920

INVENTOR
Daniel Michel Weigel
BY
Kerr, Page, Cooper & Hayward
ATTORNEYS

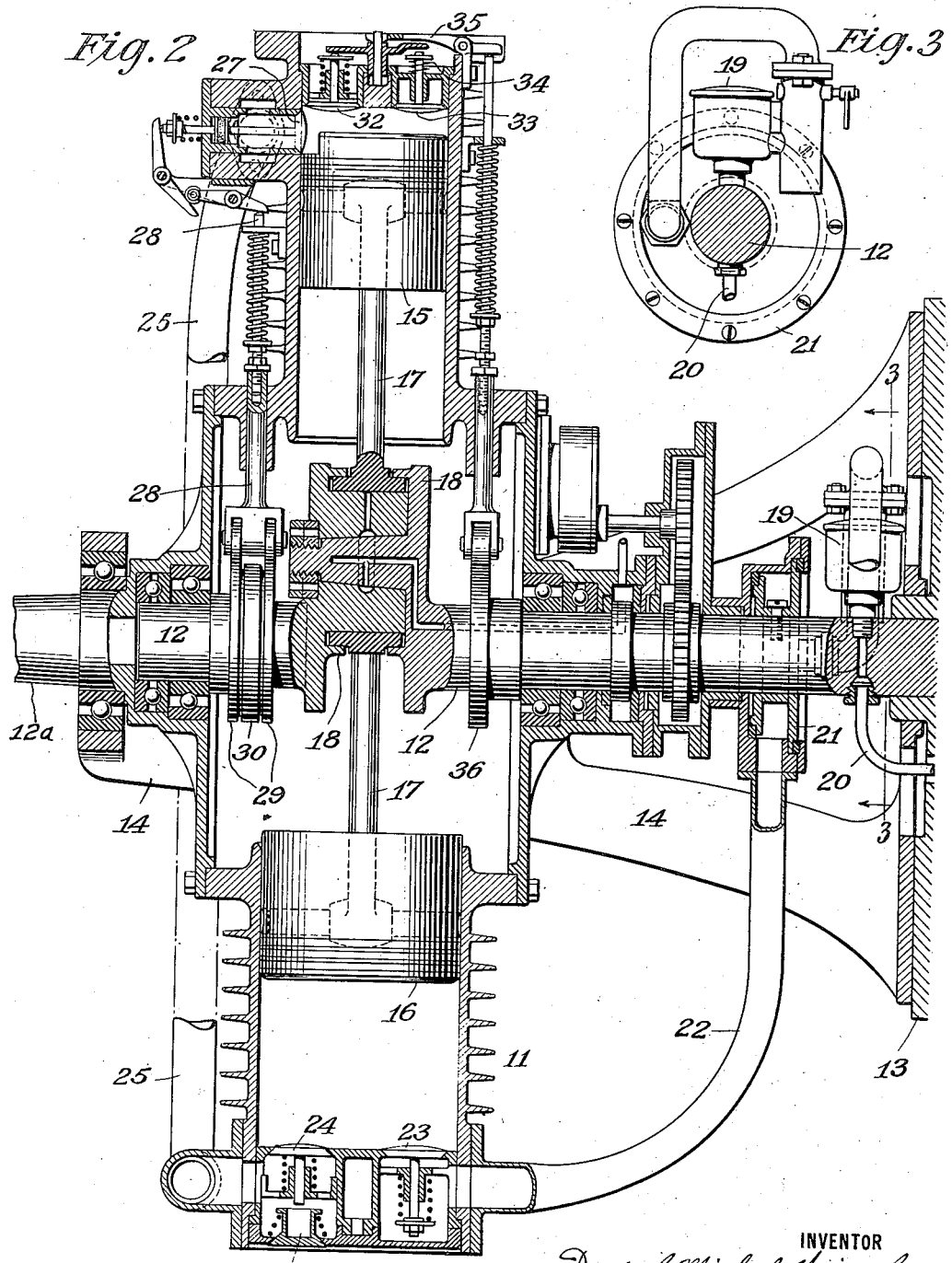

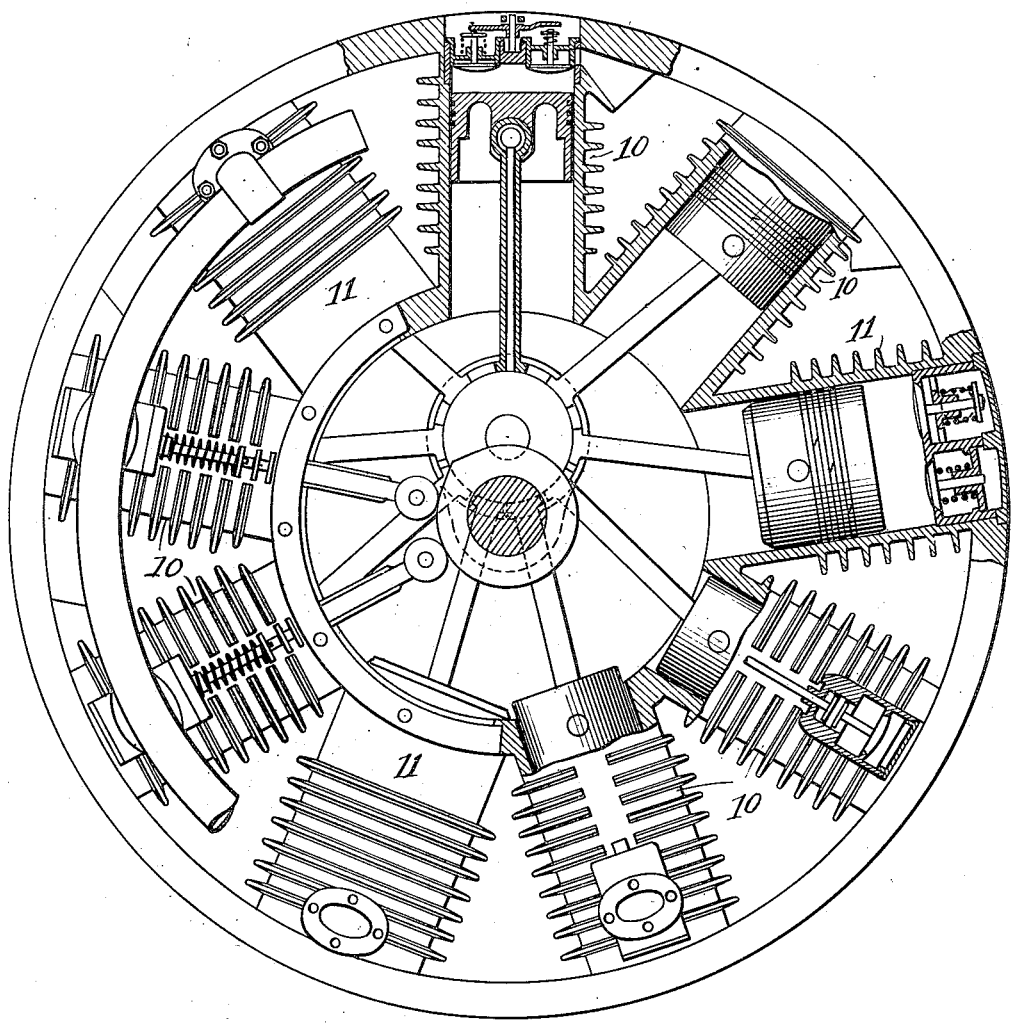

Patented July 17, 1923.

1,462,182

UNITED STATES PATENT OFFICE.

DANIEL MICHEL WEIGEL, OF CHICAGO, ILLINOIS.

INTERNAL-COMBUSTION ENGINE.

Application filed June 23, 1920. Serial No. 391,034.

*To all whom it may concern:*

Be it known that I, DANIEL MICHEL WEIGEL, being a subject of the King of Great Britain, residing at Chicago, in the county of Cook and State of Illinois, have invented certain new and useful Improvements in Internal-Combustion Engines, of which the following is a full, clear, and exact description.

This invention relates to improvements in internal combustion engines and has for its objects the provision of an engine which will operate upon a novel cycle which, in so far as frequency of explosions is concerned, is similar to the well known two stroke cycle but in which the supply and exhausting of the gases is carried out in a novel manner, whereby many of the disadvantages of that type of engine are obviated.

A further object of the present invention resides in the provision of a novel valve structure operating upon a novel cycle, whereby certain advantages of improved charging of power cylinders and improved scavenging of the cylinders of exhaust gases are attained.

Another object resides in the provision of an exhaust valve means of such character that the scavenging of the gases from the cylinders is aided by the centrifugal force set up on said gases during the rotation of the engine cylinders. Thereafter the valve closing is aided by centrifugal force.

Another object of my invention resides in the provision of a scavenging means for aiding in the removal of the products of combustion from the power cylinders. This scavenging means in cooperation with my novel cycle is adapted to provide for the admission of the maximum quantity of fuel mixture to the engine cylinders and also provides that the quantity of the burned gases that will be mixed with the incoming fuel will be appreciably reduced if not altogether eliminated.

Other objects of my invention reside in the provision of an engine provided with power cylinders and compressor cylinders in which the clearance volume of the power cylinders is not confined to the given ratio of the stroke volume of the same cylinder, but may be any volume desired and may be fixed in proportion to the stroke volume of both cylinders or to a proportion of the two combined or less than the ratio of the stroke volume of the power cylinder or cylinders, if so desired.

A further object of the present invention resides in the provision of an engine of rotary type in which any desired number of power and compressor cylinders may be used in accordance with the total power which it is desired to develop and in accordance with cooling conditions of the individual power cylinders. If desired, a double set of cylinders may be used.

Another object and advantage will be pointed out in further detail in the accompanying specification and drawings and will be more particularly set forth in the appended claims.

In the drawings,

Fig. 2 shows a sectional view taken on approximately line 2—2 of Fig. 1.

Fig. 3 is an end view of the engine showing the carburetor and inlet pipe.

Fig. 5 shows a diagrammatic elevational view partly in section of an engine having a plurality of compressor cylinders and a plurality of producer cylinders.

Figure 1:
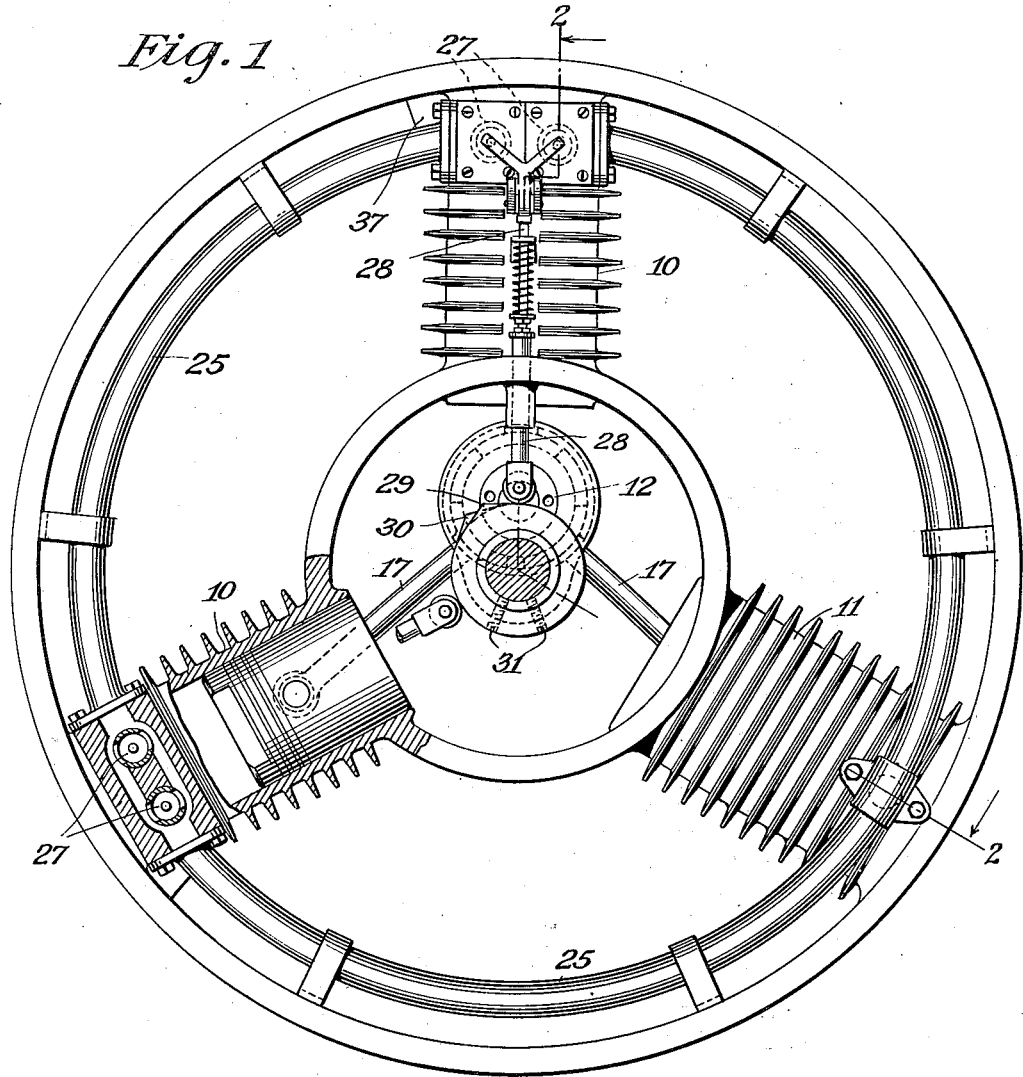
Fig. 1 shows a side elevation of one embodiment of the invention, certain parts being shown in section.
Figure 4:
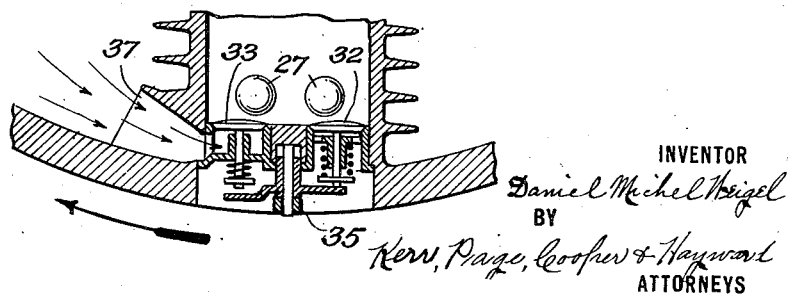
Fig. 4 is a detail sectional view of the exhaust valve and scoop for directing scavenging air into the cylinder.

In the drawings, 10 designates the energy producer or power cylinders and 11 the cylinder of the compressor. For simplicity in illustration I have shown in the detailed figures two producer cylinders and one compressor cylinder, but the invention is not limited in this respect. Any number of cylinders may be employed; for example, I may employ six producer cylinders and three compressor cylinders, as shown in Fig. 5.

12 is a stationary crank shaft held immovable in a holding frame 13 which has an extension 14 carrying bearings for the end of the shaft 12$^a$ which is rigidly connected to the power cylinder group 11. The producer pistons are shown at 15, and the compressor pistons at 16. These pistons are reciprocated by means of connecting rods 17 which connect in any suitable manner with suitable bearings 18 upon the eccentric crank pin. Carried by the fixed crank 12 is a carburetor 19 receiving fuel through line 20 and discharging the combustible mixture through a rotary distributor 21 to an inlet pipe 22. The inlet pipe leads to the compressor cylinder or cylinders 11. Here, upon the inward stroke of piston 16, the gases are induced into the cylinder past an inlet valve 23. Upon the outward stroke of the piston, valve 23 closes and valve 24 opens allowing compressed mixture to flow into a conduit 25. A safety valve 26 allows the gases to escape should accidental explosions occur in the compressor. Conduit 25 leads to the various power cylinders 10, the combustible mixture being admitted thereto through inlet valves 27. There are preferably a pair of these mechanically actuated spring closed valves for each cylinder and the valves are opened by tappets and rockers which are, in turn, actuated by push rods 28 from the inlet valve cams upon crank shaft 12.

In the novel cycle, upon which my engine operates, the admission of gas to the power cylinders is substantially at the end of the exhaust stroke of the power pistons. In this respect the engine differs from the common two cycle engine. In former engines, particularly those of the four cycle type, the compression pressure in ratio to the compression volume is fixed by the bore and stroke of the engine. With the present invention this is not the case since the combustible gases are supplied in precompressed state at a time when the piston is at or substantially at the top of its stroke. In this way the dimensions of the explosion chamber may be made at any desired ratio to the stroke volume of the compressor. The stroke volume of the producer cylinder does not control the compression pressure of itself. Hence, I can employ a far longer stroke in the "producer" and a far shallower explosion chamber, and yet obtain in the explosion chamber a lower or higher compression pressure, as I deem fit.

If, therefore, I employ a shallow explosion chamber, which gives me a lower compression pressure than would be possible if such explosion chamber were required to receive the stroke volume of the "producer," it is obvious that I am able to expand the contents of such explosion chamber to many more atmospheres than in present practice. Thus I obtain a greater swept out volume after expansion and greater number of expansions (than with the four cycle type), and a lower pressure at exhaust.

With the foregoing charging cycle in one or more of the producer cylinders there is substantially no further compression of the combustible mixture therein. With such conditions and with a single compressor cylinder compressing gases, there is a fall of pressure in the conduits 25. In order to equalize the compression pressure in the next producer cylinder receiving the mixture, means must be provided for slightly compressing the induced gas in the producer cylinder. I accordingly time one inlet valve to open slightly early and allow the gas to flow into the cylinder, and thereafter to be compressed to a point to equalize with the compression pressure of the gas in the producer cylinder which has previously received its charge. A convenient manner of attaining this result is to provide a pair of inlet cams 29 and 30 and to provide certain of the push rods 28 with forked rollers so as to cooperate with cam 29 only. The other push rod 28ª has a single roller and cooperates with cam 30 which is slightly advanced relatively to cam 29 to thereby admit the gases earlier to one of the cylinders and thereby permit the equalization of compression pressure therein. The desired timing of cams 29 and 30 may be obtained by means of set screws 31. In practice these cams will preferably be keyed upon the crank shaft and a modified timing will be obtained by a substitution of cams. The compression pressure in the producer cylinder may be varied within wide limits by a substitution of varying sized compression cylinders and by a change of valve timing as outlined above.

After the compressed gases have passed into the producer cylinders and the inlet valves are closed, ignition is effected in any desired manner. The gases then expand forcing the power pistons inwardly and setting up a rotation of the engine producer and compressor cylinders.

Upon the following out stroke of the power pistons, the burned gases are exhausted. Exhaust is effected by means of a pair of valves 32 and 33, set in the heads of the cylinders. These valves are maintained closed practically entirely by the centrifugal force set up by the rotation of the engine cylinders. In starting, these valves may be held closed by light springs 34, but for running conditions use is made of centrifugal force to hold the valves on their seats.

Valves 32 and 33 are opened by means of a forked rocker tappet 35, which is, in turn, actuated by a push rod from exhaust cam 36 on crank shaft 12. I preferably have valve 32 open in advance of valve 33, and this may be attained by providing suitable additional clearance between valve 33 and the rocker tappet.

Upon the opening of valve 32, the products of combustion pass out of the cylinder and this action is facilitated by the effect of centrifugal force upon the burned gases due to rotation of the cylinders. Upon the opening of valve 33, a hooded scoop or cowl 37 having a flared entrance extending toward the direction of rotation of the cylinders, picks up cool scavenging air which is directed into the cylinder through valve 33. This air, together with the burned gases, then passes out through valve 32 under the force exerted by the ascending piston supplemented by centrifugal force. At low speeds both valves 32 and 33 may act as exhaust valves, but as the speed increases valve 33 becomes more and more a scavenging air valve.

The cool inrushing air serves to cool the cylinder and free the clearance space of burned gases. In this manner the incoming fuel charge will not be intermingled to any substantial extent with deleterious burned gases. The valves 32 and 33 both close substantially at the top of the piston stroke and the producer cylinder is now ready to receive a fresh incoming compressed charge of fuel mixture.

By providing a suitable exhaust cam the valve timing of the exhaust valves may be varied to suit the particular engine cycle desired.

In the embodiment shown in Fig. 5 I have shown somewhat diagrammatically an engine having a plurality of producer cylinders, and a plurality of compressor cylinders. The number of each type will depend upon the desired power, and the cooling of the individual power cylinders. The number of compressor cylinders will also depend upon the compression pressure desired in the power cylinders and the compressing capacity or stroke volume ratio of the compression cylinders.

The engine described is adapted for operation under a wide variety of operating conditions. As previously explained the stroke volume ratio of the power cylinders may be varied relatively to the stroke volume ratio of the compressor to suit the desired conditions of output and other factors.

What I claim is:—

1. In an internal combustion engine, in combination, a compressor, and a rotary energy producer a fixed support therefor, said compressor being adapted to compress explosive mixture and supply the same to the energy producer, said energy producer being adapted to receive said gases in a pre-compressed state and being adapted to derive energy therefrom by their expansion when ignited, said energy producer being adapted to directly expand the gases without substantial further compression therein, said producer operating upon a two stroke power cycle and performing a complete cycle once in every revolution thereof relatively to the said fixed support, and valve means associated with said energy producer adapted to permit the scavenging of the products of combusion from said energy producer by the action of centrifugal force upon said products whereby the energy producer receives a charge of explosive mixture substantially free from combustion products.

2. In an internal combustion engine, in combination, a rotary engine cylinder having a fixed support adapted to receive explosive gas from a compressor in a pre-compressed state, and to expand said gas upon ignition without substantially further compressing the gas in said engine cylinder, said cylinder having valve means therein so timed as to prevent said further substantial compression in the cylinder, said valve means being also so timed as to give a complete power cycle in said cylinder each time the latter passes through one revolution relatively to the fixed support, said valve means being adapted to permit the cylinder to be scavenged of foul gases after the expansion stroke by means of centrifugal force exerted upon said foul gases, whereby the clearance space in said cylinder receives a full charge of compressed gas from the compressor substantially free from foul gas.

3. In an internal combustion engine having a rotary cylinder piston therein connected to a fixed crank, means for taking off power directly from said rotating cylinder, and valve therein so arranged as to permit the foul gases from the cylinder to be scavenged therefrom by means of centrifugal force acting upon the gases in the cylinder, a mechanically actuated inlet valve to admit gases to said cylinder and means for supplying compressed gas through said valve to said cylinder, said valve being so timed as to avoid further substantial compression of the gas in said cylinder.

4. In an internal combustion engine of the rotary type, in combination, a rotary cylinder piston therein and a fixed crank therefor, an inlet valve for said cylinder, means for supplying compressed gas through said valve to said cylinder, said valve being so used as to avoid further substantial compression of the gas in said cylinder said valve being so timed as to produce a complete power stroke for every complete revolution of said cylinder relative to said fixed crank.

5. In an internal combustion engine of the rotary type, in combination, a rotary power cylinder, a crank forming a fixed support therefor, an inlet valve means for said cylinder and an exhaust valve means therefor, means for supplying pre-compressed gas to said power cylinder through said inlet valve means, and means for timing the operation of said valves whereby the further substantial compression of the gases in the cylinder is avoided said last mentioned means being adapted to complete a power cycle in said cylinder once each revolution relatively to the fixed crank.

6. In a rotary internal combustion engine, in combination, a plurality of rotary power cylinders, pistons therein adapted to reciprocate therein during the rotation thereof, exhaust and inlet valve means in said cylinder, and means for supplying pre-compressed gas to said cylinders through said inlet valve means, said valve means being so timed as to prevent substantial further compression of the gas in certain of the power cylinders and to permit a predetermined slight further compression of said gases in other of the cylinders whereby compression pressures in the various power cylinders are equalized.

7. In a rotary internal combustion engine, in combination, a plurality of rotary power cylinders, valve means adapted to admit gas thereto and to permit the outflow of burned gases, means for supplying pre-compressed mixture to said cylinders through said valve means, said valve means being used to equalize the compression pressures in said cylinders by a variation in the valve timing and also being so timed as to prevent substantial further compression of the mixture in certain of the cylinders, whereby the compression pressure in the power cylinders is independent of the stroke volume ratio of the power cylinder.

8. In a rotary internal combustion engine, in combination, a plurality of rotary power cylinders, valve means therein for the inlet of fuel mixture and the exhaust of burned gases, said exhaust valve means being used to permit the burned gases to be swept out by centrifugal action set up by the rotation of the cylinders, and means comprising a scoop adapted to direct scavenging air into the cylinder through the exhaust valve means during the exhaust of the burned gases whereby the burned gases are scavenged from the cylinder by said air.

9. In a rotary internal combustion engine, in combination, a plurality of rotary power cylinders, pistons in said cylinders, said pistons having an exhaust stroke and a power stroke, said power stroke directly following the exhaust stroke; of means for pre-compressing the fuel mixture, and for admitting the same to the cylinders at a time after the completion of the exhaust stroke and before the commencement of the power stroke, of exhaust valve means in said cylinders operating to permit the burned gases to be swept out of the cylinders by the centrifugal force set up on the rotation of the cylinders, and means comprising a scoop operating upon rotation of the cylinders for directing scavenging air through the exhaust valve means into the cylinders which are exhausting burned gases, said air being thereafter swept out by the centrifugal force whereby the incoming fuel is substantially undiluted with mixed burned gases in said cylinders.

10. A rotary internal combustion engine comprising a fixed crank and a plurality of cylinders set eccentric to said crank and rotatable therearound, of pistons in said cylinders coupled to said crank, certain of said cylinders being energy producers and certain other of said cylinders being compressors said compressors being adapted to induce at each stroke of the piston therein a constant volume and amount of air, conduits connecting said compressors and energy-producing cylinders, valve means therein adapted to time the admission of compressed gas from the conduits to said energy-producing cylinders, and exhaust valve means in said cylinders having provisions to permit the burned gases to be swept out by centrifugal force set up upon the rotation of the cylinders, said compressed gas being admitted to the cylinders substantially at the end of the exhaust stroke and prior to substantial movement of the piston upon the power stroke.

11. In a rotary internal combustion engine, in combination, a rotary compressor and a rotary energy producer, means in said compressor for compressing explosive mixture, means for supplying said mixture to the energy producer, said energy producer receiving the said compressed gases in a precompressed state and deriving energy therefrom by their expansion when ignited, whereby the energy producer is rotated, connections between the energy producer and compressor to drive the latter by the former, the aforesaid energy producer including means for directly expanding the gases without further substantial compression therein other than the compression required to equalize the compression pressures in the different units of the energy producer.

12. In a rotary internal combustion engine having a plurality of cylinders revolving about a common axis, some of said cylinders being compressors to induce and compress gases and some of said cylinders being power-producers adapted to receive pre-compressed gas from the compressor and to expand said gas without substantial further compression in the power cylinders and to afterwards exhaust foul gases, pistons in said cylinders adapted to reciprocate therein, a duct between the compressor and power-producer cylinders through which the compressed gases are conveyed, a mechanically actuated inlet valve to control the admission of gases to the power cylinders, a plurality of exhaust valves and a scoop disposed over one of the valves to direct scavenging air into the cylinder which is exhausting burned gases.

13. In a rotary internal combustion engine, a rotary cylinder, a plurality of exhaust valves disposed in the head of said cylinder, a scoop disposed over one of said valves and having an opening facing the direction of rotation of the engine cylinder, means for opening said valves, said scoop being adapted to direct a current of air into the cylinder and scavenge the burned gases which are forced out through the other valve.

14. In a rotary internal combustion engine having a plurality of rotating cylinders, in combination, a plurality of exhaust valves disposed in the heads of said cylinders, means for mechanically opening said valves to permit the outward flow of the burned gases, said flow being aided by the centrifugal force set up by the rotation of the cylinders, a scoop disposed over one of said valves and facing the direction of rotation of the cylinders, said scoop being adapted to direct scavenging air into the cylinders to clear the cylinders of burned gases through the other exhaust valve.

15. In a rotary engine having rotating cylinders, in combination, a plurality of mechanically opened exhaust valves in the heads of said cylinders, and scoops disposed over certain of said valves and adapted to direct air therethrough which is adapted to scavenge the burned gases through the other unhooded exhaust valves.

16. In a rotary internal combustion engine having rotating cylinders, exhaust valve means in the heads of said cylinders through which the burned gases are expelled by centrifugal force, and scoops disposed over portions of said valve means adapted to direct a current of air into the cylinders to assist in the expulsion of the burned gases.

17. In a rotary internal combustion engine having rotating cylinders, mechanically actuated exhaust valves in the heads of said cylinders, means comprising scoops for directing scavenging air through the exhaust valves into said cylinders to thereby aid the centrifugal expulsion of the burned gases through the exhaust valves, compressors rotating upon the same axis as the rotating cylinders, ducts leading from the said compressors and mechanically actuated inlet valves adapted to admit compressed gases from said ducts to the rotating cylinders substantially at the end of the upward strokes of the pistons operating in said cylinders.

18. In a rotary internal combustion engine having a plurality of rotary power cylinders and suitable rotary compressor cylinders, said compressor cylinders being adapted upon rotation to supply pre-compressed gas to the power cylinders, said power cylinders having a clearance volume which is independent of the stroke volume ratio of the power cylinders and entirely dependent upon the stroke volume ratio of the compressor and the timing of the gas flow to said power cylinders from the compressor cylinders for the purpose described, said compressor being adapted to induce a constant quantity of air upon each power cycle.

In testimony whereof I hereto affix my signature.

DANIEL MICHEL WEIGEL.